US010309398B1

(12) United States Patent
Wagner

(10) Patent No.: US 10,309,398 B1
(45) Date of Patent: Jun. 4, 2019

(54) PASSAGE ARRANGEMENT FOR COOLING, LUBRICATING AND REDUCING THE SIZE OF ROTARY MACHINES

(71) Applicant: Jerald G. Wagner, Myakka City, FL (US)

(72) Inventor: Jerald G. Wagner, Myakka City, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 191 days.

(21) Appl. No.: 15/255,657

(22) Filed: Sep. 2, 2016

(51) Int. Cl.
*F04C 2/16* (2006.01)
*F04C 18/16* (2006.01)
*F16C 33/66* (2006.01)
*F16C 37/00* (2006.01)
*F16J 15/447* (2006.01)

(52) U.S. Cl.
CPC ........... *F04C 18/16* (2013.01); *F04C 2/16* (2013.01); *F16C 33/6659* (2013.01); *F16C 37/007* (2013.01); *F04C 2240/60* (2013.01); *F04C 2270/17* (2013.01); *F16C 33/664* (2013.01); *F16J 15/4472* (2013.01)

(58) Field of Classification Search
CPC .......... F04C 18/16; F04C 2/16; F04C 27/009; F04C 2240/60; F04C 2270/17; F01D 11/02; F16J 15/447; F16J 15/4772; F16J 15/4776

See application file for complete search history.

(56) References Cited

U.S. PATENT DOCUMENTS

| 4,198,063 | A  | * | 4/1980  | Shimizu ................. | F01D 11/02 277/387 |
| 4,878,820 | A  | * | 11/1989 | Doi ..................... | F04C 29/0021 418/203 |
| 4,963,041 | A  |   | 10/1990 | Sowards | |
| 6,135,641 | A  |   | 10/2000 | Smith | |
| 6,367,807 | B1 | * | 4/2002  | Rockwood .......... | F16J 15/4478 277/412 |
| 8,340,489 | B2 |   | 12/2012 | Sarmaala | |
| 8,600,707 | B1 | * | 12/2013 | El-Aini .............. | F01D 11/02 703/1 |
| 2004/0209789 | A1 | * | 10/2004 | Swallow ............. | C10M 105/00 508/485 |
| 2006/0153698 | A1 |   | 7/2006 | Makino et al. | |
| 2010/0247366 | A1 | * | 9/2010 | Kato ..................... | F04C 18/16 418/201.1 |
| 2015/0004015 | A1 | * | 1/2015 | Kienzle .................. | F04C 18/16 417/312 |

FOREIGN PATENT DOCUMENTS

JP          63285279 A  * 11/1988  ............ F04C 27/009

* cited by examiner

*Primary Examiner* — Mary Davis

(57) ABSTRACT

A fluid-moving rotary device that has a drive mechanism whose rotational axis is aligned with a rotational axis of a driven component and another component that rotates about an axis offset from rotational axis of the driven component. The drive mechanism is located on a fluid inlet side of the components and is cooled by the fluid entering the device.

8 Claims, 3 Drawing Sheets

PASSAGE ARRANGEMENT FOR COOLING, LUBRICATING AND REDUCING THE SIZE OF ROTARY MACHINES

GOVERNMENT LICENSE RIGHTS

The U.S. Government has a paid-up license in this invention and the right in limited circumstances to require the patent owner to license others on reasonable terms as may be provided for by the terms of Contract Number: W31P4Q-13-C-0049_CFMH, Contract Title: Vapor-Liquid Pump for Mixed Phase Refrigerant, awarded by the U.S. Army Aviation and Missile Command-Redstone.

CROSS-REFERENCE TO RELATED APPLICATION

This application is related to U.S. patent application Ser. No. 15/255,200, filed Sep. 2, 2016, entitled "Improved Rotary Machine Providing Thermal Expansion Compensation, And Method For Fabrication Thereof" in the name of Jerald G. Wagner and to U.S. patent application Ser. No. 15/255,617, filed Sep. 2, 2016, entitled "Non-Contracting Bidirectional Seal for Gaseous Rotary Machines" in the name of Jerald G. Wagner et al.

BACKGROUND AND SUMMARY OF THE INVENTION

The present invention relates to rotating machinery systems such as screw-type compressors, superchargers, and hermetically sealed refrigerant compressors where the drive motor is located on the suction side of the compressors. More specifically, the present invention is directed to unequally proportioned fluid passages that run axially along the motor to cool the motor in a way that provides a compact package. These passages are sized to transport lubricant expelled from a unique motor bearing oiling scheme along with the main fluid to complete the lubrication system.

Size and weight reduction of a screw compressor is highly desirable but problematic to achieve because of the need to both lubricate and cool the drive motor which generates heat that must be dissipated to ensure continued and reliable motor operation. One way of generating high motor power in a small package is to spin the motor at a very high speed, where lubrication of the motor bearings is critical. An object of my invention is a provide a way of porting lubricant to the motor bearings to lubricate and cool the bearings by flowing the lubricant through the bearing and expelling it into the main fluid flow where it is transferred to the compressor through the main fluid passages while entrained in the main fluid.

Another object of my invention is to achieve a compact screw compressor package wherein the motor directly drives one of the compressor screws in a two-screw compressor. Direct drive positions the motor on the same centerline as the driven compressor screw. The second compressor screw in a two-screw compressor meshes with the first screw, and is therefore positioned parallel to and aligned with the first screw, as shown in FIG. 2 described below. This creates an offset between the screw housing and motor housing as can be seen in FIG. 3. The main fluid passages in my invention are positioned to occupy this offset area on the suction side of the compressor where the motor resides, containing the overall cross section of the compressor/motor assembly in a minimized package size. The main fluid passages are sized to provide mist-flow velocities to carry the bearing lubricant entrained in the main fluid, while having sufficient surface area to cool the drive motor.

Before proceeding, it should be noted that the term "passage" and "opening" as used herein should be interpreted as essentially any structural element that is able to direct fluid between first and second points.

BRIEF DESCRIPTION OF THE DRAWINGS

Other objects, advantages and novel features of the present invention will become apparent from the following detailed description when considered in conjunction with the accompanying drawings herein.

DETAILED DESCRIPTION OF THE DRAWINGS

Figure 1:
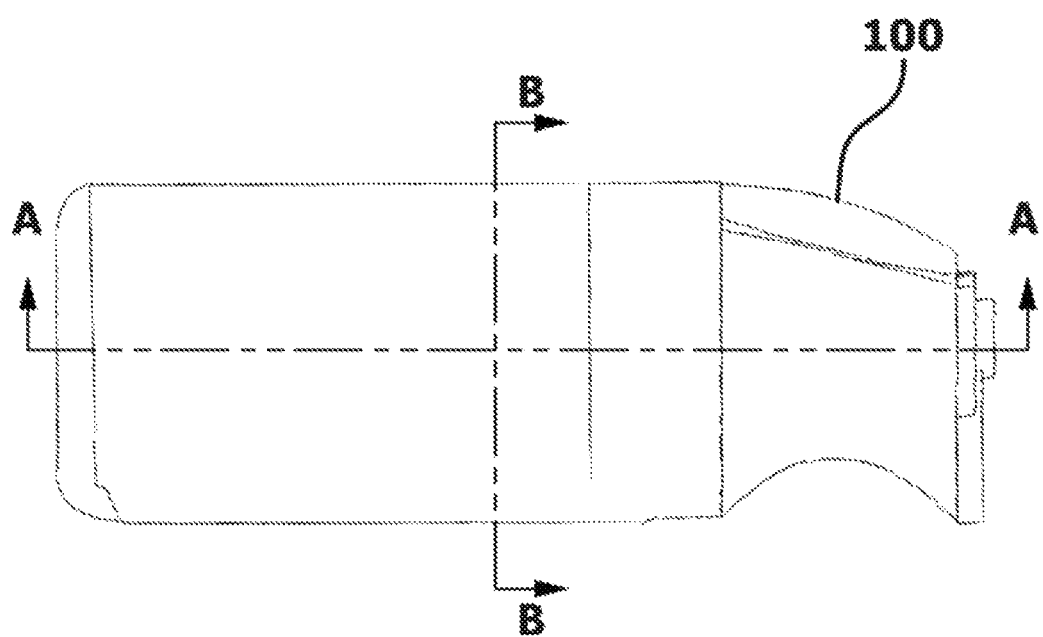
FIG. 1 is an elevational view of a screw compressor of generally known construction that uses the principles on my invention.
Figure 2:
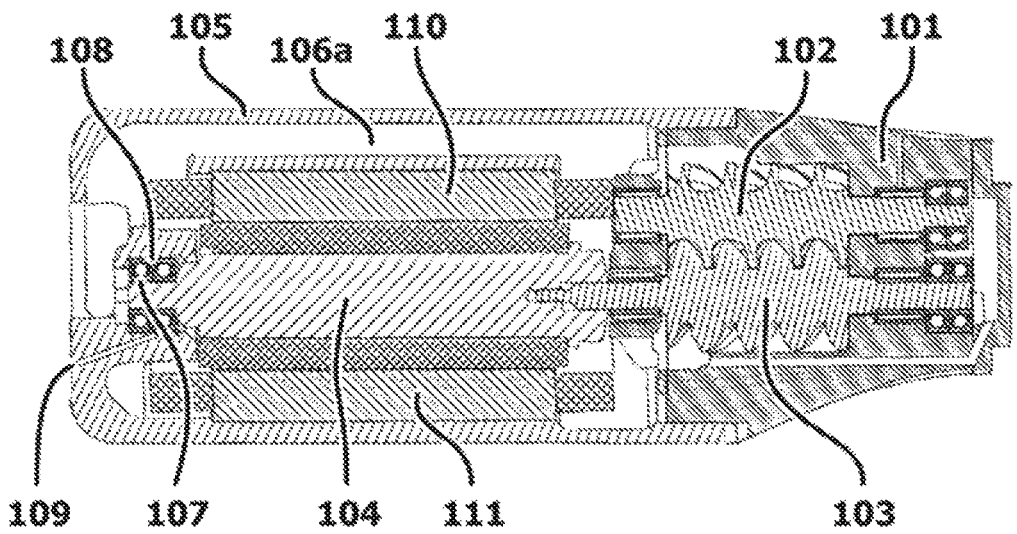
FIG. 2 is a cross-sectional plan view of the two-screw compressor of FIG. 1 but with a direct drive motor, bearing lubrication, and main fluid passages according to my invention taken along line A-A of FIG. 1.

Referring now to FIGS. 1 and 2, a housing 101 of a screw compressor, generally designated by numeral 100, houses a two-screw compressor comprised of a screw 103 directly driven by a motor 110 and a mating screw 102, where the screw 102 is offset from the motor centerline to mesh with screw 103 in a generally known manner. Housing 101 is therefore "disproportioned" about centerlines of a motor shaft 104 and the screw 103 to also enclose the screw 102. In one compact package embodiment of the screw compressor 100 of my invention as seen along the rotational axis, fluid transfer ports 106a, 106b, and 106c are positioned to occupy the region set by the offset in housing 101 required to enclose the screw 102.

Figure 3:
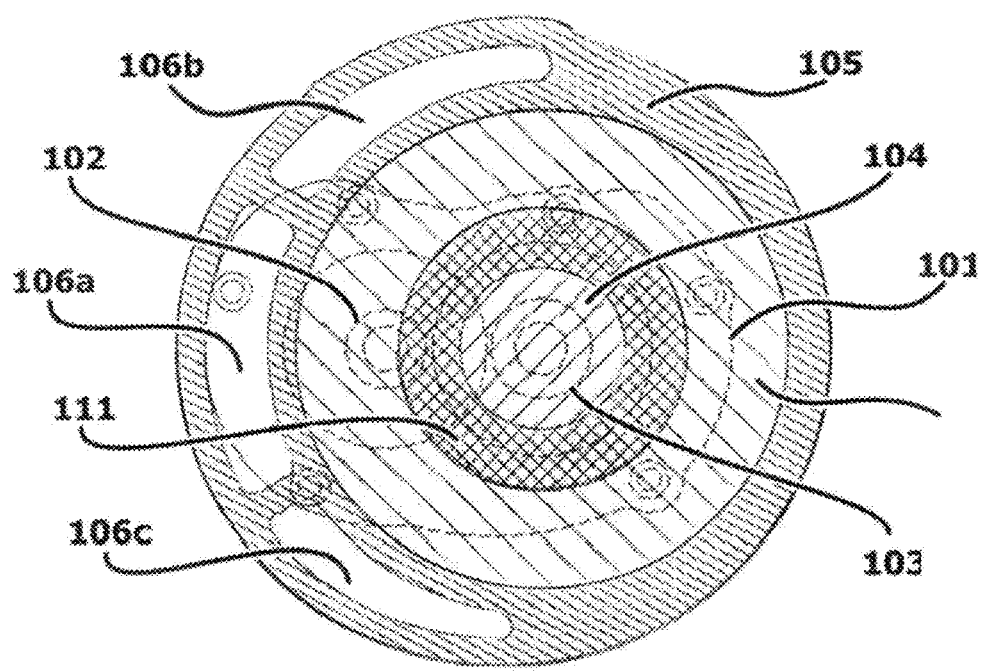
FIG. 3 is a cross-sectional plan view of the two-screw compressor with a direct drive motor, bearing lubrication, and main fluid passages according to my invention taken along line B-B of FIG. 1.

FIG. 3 shows an embodiment of my invention where the main fluid transfer port 106a is sized to encompass the offset in housing 101 required to enclose compressor screw 102.

Figure 4:
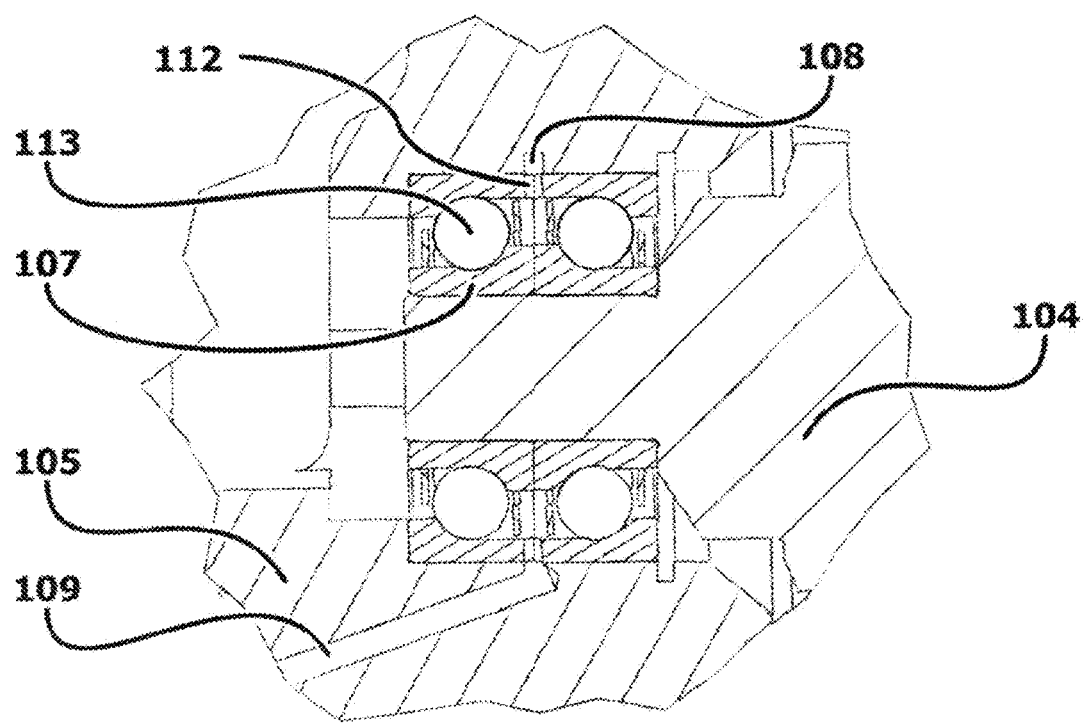
FIG. 4 is an enlarged isolated view showing details the motor shaft bearing and lubrication passages shown in FIG. 2, it being understood that the bearings are arranged cylindrically around a shaft in a known manner.
Figure 5:
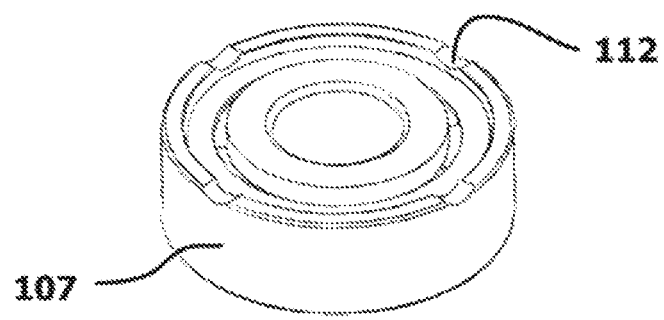
FIG. 5 is an isometric view of one motor shaft bearing used in the arrangement of FIG. 4 in accordance with my invention.

FIGS. 4 and 5 show a bearing arrangement according to my invention where pressurized liquid lubricant (such as POE for an R-134a refrigeration system compressor) is fed through a port 109 to an annular groove 108. Two bearings 107 are mounted back-to-back in the housing 105 for loading in radial and both axial directions. In this embodiment, adjoining faces with lubricant passages 112 as shown in FIG. 5 are arranged face-to-face and align with the housing groove 108. Lubricant enters bearing rolling elements 113 through the passages 112. Lubrication and cooling of the bearings occur, then the lubricant is expelled into the series of the main fluid transfer ports 106a, 106b, 106c in the housing 105 as described above.

The total cross sectional area of the main fluid passage 106a in combination with the ports 106b, and 106c shown in FIG. 3 are sized to operate at a flow velocity to entrain the lubricant expelled from the bearings 107 in the main fluid and transport that entrained lubricant to the compressor screws with the main fluid. As will now be apparent to one skilled in the art, the area will vary according to different compressor configurations, applications and the like, and can be readily determined through routine experimentation.

The passages 106a, 106b, and 106c also enable the components of the motor 110 to be cooled with the main fluid. This requires sufficient surface area adjacent to the motor components to thermally transfer motor heat from the motor components 110, through the housing 105, and into the main fluid. In a refrigeration compressor this thermal event ensures that the main fluid, such as R-134a, is in a superheated state after it passes the motor. I have found that the passages 106a, 106b, and 106c do not need to surround all of the motor components 110 for sufficient cooling, with the housing 105 being configured to transfer heat to the compressor surroundings and conductively transfer that heat to the passages 106a, 106b, and 106c to achieve a more compact overall compressor package. In one embodiment, the gap between motor components 110 and 111 will act as a main fluid passage for cooling.

Although I have described my invention specifically with regard to hermetic screw-type compressors used in refrigeration systems, it is to be understood that my invention is not limited to those specific systems. I intend to cover all related devices as are encompassed by the claims and not just the details disclosed and described herein.

I claim:

1. A rotary device, comprising:
   a housing,
   a first component rotatable about a first axis within the housing,
   a second component within the housing and configured to rotate about a second axis offset from the first axis and relative to the first component; and
   a drive mechanism within the housing and having a shaft whose rotational axis is aligned with the first axis of the first component, with one end of the shaft of the drive mechanism being operatively connected with the first component for driving the first component and another end of the drive mechanism being supported by a bearing arrangement,
   wherein passages are grouped together and contained in an offset portion of the housing that only partially surrounds the rotational axis for allowing a main fluid to flow through the rotary device.

2. The rotary device of claim 1, wherein the first and second components have a fluid inlet side, and the drive mechanism is located on the fluid inlet side of the first and second components and is cooled by the main fluid entering the rotary device through the passages.

3. The rotary device of claim 2, wherein the main passages are configured to be of different areas.

4. The rotary device of claim 3, wherein the drive mechanism includes a gap forming a cooling passageway and being operatively connected with the passages to provide cooling of the first and second components.

5. The rotary device of claim 1, wherein the passages are arranged at the fluid inlet side and are configured to transport lubricating fluid entrained in the main fluid with a velocity sufficient to carry the entrained lubricating fluid to the first and second components.

6. The rotary device of claim 1, wherein the first and second components are screws comprising a screw compressor.

7. The rotary device of claim 1, wherein the bearing arrangement has at least one outer race and associated rolling elements to which lubricant is supplied through a port to a radial groove around at least one portion of one bearing outer race and a plurality of face grooves aligned with a face of the at least one bearing outer race to admit lubricant from outside the at least one outer race to the rolling elements.

8. The rotary device of claim 1, wherein the passages are formed between the housing and the drive mechanism.

* * * * *